United States Patent Office 3,417,092
Patented Dec. 17, 1968

3,417,092
METHOD FOR PRODUCING PYRIDINE
Tetsuro Matsumoto and Akira Tamano, Niigata-shi, Japan, assignors to Japan Gas-Chemical Company, Inc., Tokyo, Japan, a corporation of Japan
No Drawing. Continuation of application Ser. No. 313,735, Oct. 4, 1963. This application June 29, 1966, Ser. No. 561,647
Claims priority, application Japan, Oct. 5, 1962, 37/44,213
1 Claim. (Cl. 260—290)

ABSTRACT OF THE DISCLOSURE

This application relates to the selective synthesis of pyridine in high yields and accompanied by little or no production of picolines. The process comprises reaction of an aliphatic aldehyde having four carbon atoms in a straight chain with ammonia in the presence of methanol, formaldehyde, trioxane, paraformaldehyde or mixtures thereof on a condensation catalyst and at a temperature of from 300° to 600° C. More specifically, this application discloses addition of a promoter, which may be a halide or sulfate of zinc or cadmium, to the catalyst in the reaction mixture.

This invention relates to methods for synthetizing pyridine from an aliphatic aldehyde having 4 carbon atoms and methanol or its derivatives or a mixture of the latter two and ammonia by use of a catalyst having dehydrating function. This application is a continuation of application Ser. No. 313,735 filed Oct. 4, 1963, and now abandoned.

As for methods of synthetizing the pyridine or its homologues from an aliphatic aldehyde and ammonia there have been known many studies in literatures. However these have aimed at the picoline whose synthesis is relatively easy, and almost no literature has been found as to the synthesis of the pyridine having high utility value. For example the methods of Japanese Patents 156,434 and 211,792 and those of U.S.P. 2,523,580 and U.S.P. 2,698,849 all have aldehydes or hydrocarbons of less than 3 carbon atoms as starting materials and have α- and γ-picoline, i.e. pyridine homologues as objects. The method of U.S.P. 2,807,618 relates to a method which produces a large amount of β-picoline simultaneously with pyridine. Though Tchitchibabine [Bulletin de la societe chimique de France 3,764 (1936)] recites the condensation reaction between crotonaldehyde having 4 carbon atoms and ammonia, it does not go beyond synthesis of such homologues of pyridine as aldehydecollidine and the like and nothing has both disclosed as to the method for the production of pyridine.

Apart from these publicly known methods, we have studied the synthesis of the most useful and valuable pyridine without producing by-product of pyridine derivatives. As the result of extensive study, we have discovered that pyridine can be synthetized almost without accompanying other products and, with excellent yield by reacting an aliphatic aldehyde having 4 carbon atoms and methanol or formalin (aqueous solution of formaldehyde, paraformaldehyde, trioxane, etc.), or a mixture of the above two or derivatives of alcohol having one carbon atom such as methylal and the like with ammonia on a dehydrating and dehydrogenating catalyst. Namely, the method of this invention lies in that an aliphatic aldehyde having 4 carbon atoms is reacted with a derivative of an alcohol having one carbon atom alone or a mixture of the same alcohol derivatives in the presence of ammonia, at a temperature between 300°–600° C. in the presence of a dehydrating and dehydrogenating catalyst (i.e. silica, alumina, thoria, magnesia, beria, calcium oxide, strontium oxide, barium oxide, cadmium oxide, zinc oxide, titania, zirconia, lead oxide, tin oxide, chromium oxide, manganese oxide, molybdenum oxide, nickel oxide, or a mixture of these) or by use of the foregoing catalyst together with a promoter such as a halide or sulfate of cadmium or zinc or a mixture of these to produce a pyridine having no substituted radicals.

The aliphatic aldehydes having 4 carbon atoms used in this invention means $C_4$-aldehyde having straight chain such as n-butyraldehyde, β-alkoxybutynaldehyde, crotonaldehyde, etc., and carbon atoms in the alkoxy radical existing in the branch should be excluded from the number of carbon atoms of the above aldehydes.

As one example of the preferred catalyst in this invention a silica-alumina catalyst with addition of cadmium fluoride as a promoter which is illustrated in Example 1 can be cited. As a method for preparing this catalyst, such a method as a shaped product of silica-alumina containing from 50 to 95 percent silica is soaked sufficiently in aqueous solution of cadmium fluoride and dried, is suitable. It is possible to add a promoter of cadmium fluoride to the silica-alumina catalyst in an amount of from 5 to 10 percent in this procedure.

According to the method of this invention, when crotonaldehyde is used as an aliphatic $C_4$-aldehyde, and a mixture of an aqueous solution of formaldehyde and methanol are selected as a derivative of $C_1$-alcohol, the mixture of the above two raw-materials are fed onto the foregoing silica-alumina type catalyst kept at a temperature of 500° C., in the presence of ammonia and a resulting organic base is collected, from which the pyridine is produced with 67 percent of theoretical yield based on crotonaldehyde with the production of picolines being almost negligible. When this value of yield is compared with the highest yield ever known in literatures i.e. with 35 percent of U.S.P. 2,807,618, the former is almost twice as much as the latter.

Detailed explanation of the present invention will be made in the following examples, proportions here and elsewhere herein being expressed as parts by weight, and each percent showing the percentage to theoretical yield based on crotonaldehyde.

Example 1

70 parts of crotonaldehyde and 81.2 parts of 37 percent by weight of aqueous solution of formaldehyde are admixed. This solution is sent to an evaporator at a rate of 2 parts per minute by a metering pump to vaporize therein and is mixed wtih ammonia gas introduced from the other side at a rate of 1 part per minute, and the resulting mixture is preheated in a preheater to a temperature of 500° C.

Subsequently the mixed gas is sent onto 70 parts of a silica catalyst heated at the temperature of 500° C., and the resulting product is caught by two stage cooling, i.e. in the first stage by means of water and in the second stage by means of Dry Ice. The liquids caught in the two parts are combined and subjected to salting-out by use of potassium hydroxide. Then the base is extracted with ether. After dehydrating the other layer with potassium hydroxide, ether is distilled off and the residual base is caught by fractional distillation.

28 percent pyridine is obtained in addition to 4 percent β-picoline.

Example 2

70 parts of crotonaldehyde, and 76 parts of methylal are admixed. The mixture is vaporized as in Example 1, admixed with ammonia gas, and preheated to 450° C. Subsequently this mixed gas is brought to reaction by use of an alumina catalyst heated at the temperature of 500° C., by which 18 percent pyridine is obtained along with 2 percent β-picoline.

Example 3

A mixture of 102 parts of β-methoxybutyraldehyde, 30 parts of trioxane, and 32 parts of methanol is brought to reaction as in Example 1 by use of a silica-alumina catalyst (80:20) heated at the temperature of 350° C., by which 37 percent pyridine and 5 percent pyridine are obtained, each percent being based on β-methoxybutyraldehyde.

Example 4

A mixture of 70 parts of crotonaldehyde, 81.2 parts of 37 percent by weight of formaldehyde is brought to reaction as in Example 1 by use of a silica-alumina-thoria catalyst (75:15:10), by which 41 percent pyridine and 5 percent β-picoline are obtained.

Example 5

A mixture of 70 parts of crotonaldehyde, 40 parts of paraformaldehyde (formaldehyde content is 80 percent by weight) and 30 parts of methanol is brought to reaction as in Example 1 by use of a silica-alumina-magnesia catalyst (80:13:7), by which 42 percent pyridine and 7 precent β-picoline are obtained.

Example 6

According to a method in Example 4 and by use of a silica-alumina-beria (83:10:7) catalyst, 29.0 percent pyridine is obtained.

Example 7

According to a method in Example 4 and by use of a silica-alumina-calcium oxide (83:10:7) catalyst, 29.4 percent pyridine and 4.9 percent β-picoline are obtained.

Example 8

According to a method in Example 4 and by use of a silica-alumina-strontium oxide (83:10:7) catalyst, 36 percent pyridine and 5.9 precent β-picoline, are obtained.

Example 9

According to a method in Example 4 and by use of a silica-alumina-barium oxide (83:10:7) catalyst, 36.3 percent pyridine and 4.1 percent β-picoline, are obtained.

Example 10

According to a method in Example 4 and by use of a silica-alumina-cadmium oxide (80:12:8) catalysts, 58.0 percent pyridine and 7 percent β-picoline, are obtained.

Example 11

According to a method in Example 4 and by use of a silica-alumina-zinc oxide (83:10:7) catalyst, 33.9 percent, pyridine is obtained.

Example 12

According to a method in Example 4 and by use of a silica-alumina-titania (83:10:7) catalyst, 35.3 percent pyridine and 4.2 percent β-picoline, are obtained.

Example 13

According to a method in Example 4 and by use of a silica-alumina-zirconia (83:10:7) catalyst, 28.1 percent pyridine and 5.8 percent β-picoline, are obtained.

Example 14

According to a method in Example 4 and by use of a silica-alumina-lead oxide (83:10:7) catalyst, 38.4 percent pyridine and 3.1 percent β-picoline, are obtained.

Example 15

According to a method in Example 4 and by use of a silica-alumina-tin oxide (83:10:7) catalyst, 29.8 percent pyridine and 11.0 percent β-picoline, are obtained.

Example 16

According to a method in Example 4 and by use of a silica-alumina-chromium oxide (83:10:7) catalyst, 28.2 percent pyridine and 10.6 percent β-picoline, are obtained.

Example 17

According to a method in Example 4 and by use of a silica-alumina-manganese oxide (83:10:7) catalyst, 30.1 percent pyridine and 9.9 percent β-picoline, are obtained.

Example 18

According to a method in Example 4 and by use of a silica-alumina-molybden oxide (83:10:7) catalyst, 36.5 percent pyridine and 17.8 percent β-picoline, are obtained.

Example 19

According to a method in Example 4 and by use of a silia-alumina-nickel oxide (83:10:7) catalyst, 37.5 percent pyridine and 3.7 percent β-picoline, are obtained.

Example 20

70 parts of crotonaldehyde, 100 parts of 37 percent by weight aqueous solution of formaldehyde and 30 parts of methanol are mixed. This solution is sent to an evaporator at a rate of 2 parts per minute to vaporize there in and is mixed with ammonia gas introduced from the other side at a rate of 1.5 parts per minute, and resulting mixture is preheated in a preheater to a temperature of 400° C. Subsequently the mixed gas in sent onto 7 parts of a catalyst of silica-alumina shaped product incorporated with a promoter of cadmium fluoride ($SiO_2$ 85:$Al_2O_3$ 12:$CdF_2$3) which is previously heated to 450° C. and the resulting product is caught by cooling of Dry Ice-methanol mixture. Resulting product is, then, extracted with benzene and dehydrated by potassium hydroxide. After distilling off benzene, the product is subjected to fractional distillation.

From 2,000 parts of the foregoing feed, 530 parts of pyridine (67.2 percent) are obtained along with 74.5 parts (8.0 percent).

Example 21

According to a method in Example 20 and by use of a silia-alumina catalyst incorporated wtih a promoter of zinc fluoride ($SiO_2$ 75:$Al_2O_3$12:$ZnF_2$13), 60 percent of pyridine and 10% of β-picoline, are obtained.

Example 22

According to a method in Example 20 and by use of a silia-alumina catalyst incorporated with a promoter of cadmium sulfate (83:10:7), 49.2 percent of pyridine and 7.5 percent of β-picoline, are obtained.

Example 23

According to a method in Example 20 and by use of a silica-alumina catalyst incorporated with a promoter of zinc chloride (83:10:7), 40.1 percent pyridine and 10.0 percent β-picoline, are obtained.

Example 24

According to a method in Example 20 and by use of a ssilica-alumina catalyst incorporated with a promoter of cadmium chloride (83:10:7), 42.7 percent pyridine and 4.6 percent β-picoline, are obtained.

Example 25

According to a method in Example 20 and by use of a silica-alumina catalyst incorporated with promoters of zinc fluoride and cadmium sulfate (80:10:5:5), 61.0 percent pyridine and 8.0 percent β-picoline, are obtained.

What we claim is:

1. In a process for selectively synthesizing pyridine wherein an aliphatic aldehyde having 4 carbon atoms in a straight chain is reacted with ammonia and a compound selected from the group consisting of methanol, formaldehyde, trioxane, paraformaldehyde and mixtures thereof on a dehydrating and dehydrogenating catalyst selected from the group consisting of silica, alumina, thoria, magnesia, beria, calcium oxide, strontium oxide, barium oxide, cadmium oxide, zinc oxide, titania, zirconia, lead oxide, tin oxide, chromium oxide, manganese oxide, molybdenum oxide, nickel oxide and a mixture thereof at a temperature of from 300 to 600° C., the improvement which comprises including a promoter seelcted from the group consisting of cadmium halide, zinc halide, cadmium sulfate, zinc sulfate and mixtures thereof with the catalyst in the reaction mixture.

References Cited

FOREIGN PATENTS

| 742,643 | 12/1955 | Great Britain. |
| 898,869 | 6/1962 | Great Britain. |
| 907,059 | 10/1962 | Great Britain. |
| 955,702 | 1/1963 | Canada. |

HENRY R. JILES, *Primary Examiner.*

A. L. ROTMAN, *Assistant Examiner.*